Patented July 11, 1950

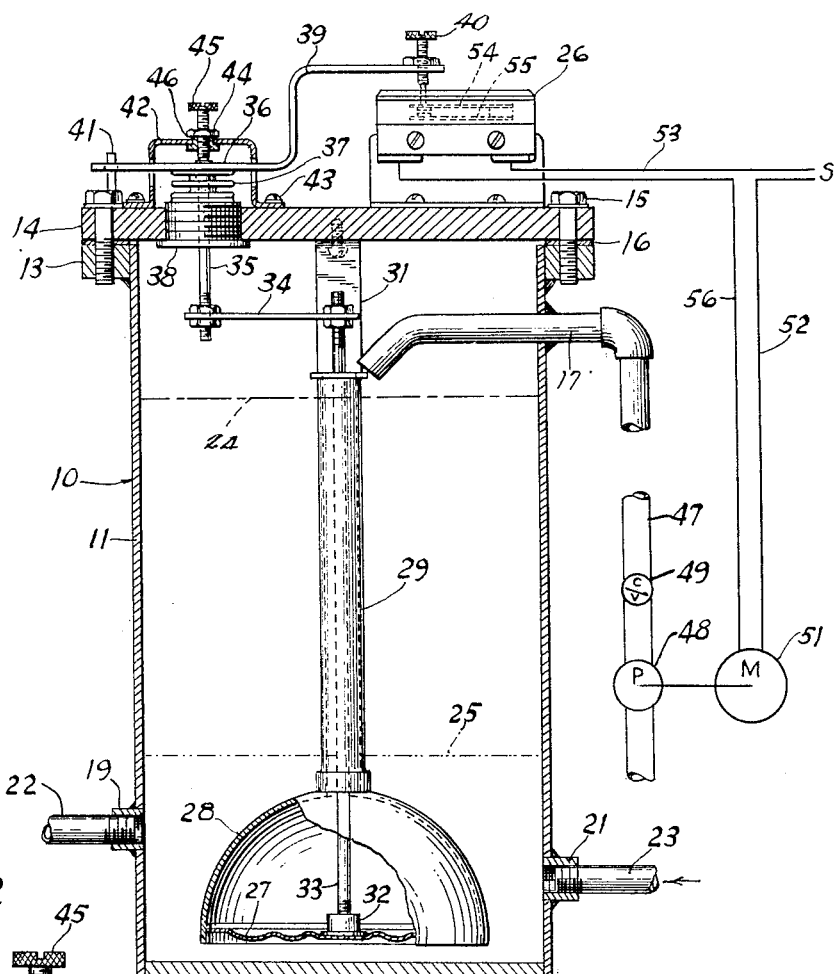
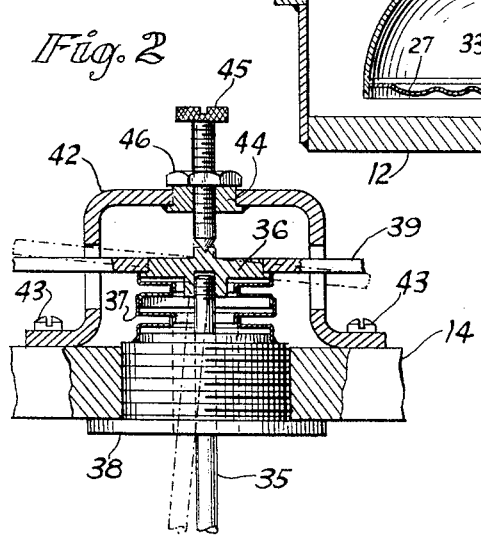

2,514,632

UNITED STATES PATENT OFFICE 2,514,632

LIQUID LEVEL CONTROL

Charles H. Flubacker, Chicago, Ill., assignor to Cook Electric Company, Chicago, Ill., a corporation of Illinois Application May 22, 1947, Serial No. 749,706

10 Claims. (Cl. 103—25)

This invention relates to liquid level controlling devices of the balanced pressure type for gas and liquid apparatus, and it is an object of the invention to provide improved apparatus of this character.

It is a further object of the invention to provide an improved liquid level controlling device of the character indicated which will operate at high pressures, such as in steam boilers, or at relatively low pressures, such as in carbonating apparatus, and is sufficiently sensitive so as to operate on pressure differentials determined by liquid levels varying only a few inches from maximum to minimum.

It is a further object of the invention to provide in a liquid level control device having a pressure sensitive device in a container, external operating means and a seal between the container and the external operating means, an improved structure for preventing gas pressure against the seal from exerting a force on the pressure sensitive device while still permitting the pressure sensitive device to actuate the operating means.

It is a further object of the invention to provide improved apparatus of the character indicated that is simple in form, easy to construct, and efficient in operation.

In carrying out the invention in one form, a liquid level control device is provided comprising a container for holding the liquid, and liquid communicating means associated therewith for supplying liquid to the container. A flexible diaphragm is arranged inside of the container and is adapted to have one side thereof exposed to the pressure of the liquid in the container. Means are provided for subjecting the other side of the diaphragm to substantially constant liquid pressure and actuating means are associated with this other side of the diaphragm for controlling the supplying of liquid through the communicating means in response to changes in liquid level in the container. More particularly, the actuating means includes a link connected to the diaphragm and passing out of the container, a flexible seal being provided between the container and the actuating means together with means for resisting outward movement of the seal. The point of seal attachment to the link and the link attachment to the diaphragm are displaced so that movements of the diaphragm produce canting of the link.

For a more complete understanding of the invention reference should be had to the accompanying drawing in which:

Figure 1 is a sectional elevational view of gas and liquid mixing and storing apparatus embodying the invention; and Fig. 2 is a fragmentary view on a larger scale of Fig. 1.

Referring more particularly to the drawing, the invention is shown embodied in gas and liquid apparatus which, for example, may be carbonating apparatus including a container 10 which may be constructed of any suitable gauge of metal to withstand pressures desired. The container may be constructed in any desired manner, and, as illustrated, includes a cylindrical wall 11 to which is attached by welding, for example, a bottom 12 and an annular ring 13 at the top thereof. In order to close the container a metallic cover 14 is provided, and is attached to annular ring 13 by means of bolts 15, a gasket 16 being placed therebetween for effectively sealing the inside of the container against relatively high or low pressures. Adjacent the upper end of cylindrical wall 11 a conduit 17 is attached by welding, for example, within a suitable opening for conducting liquid, such for example as water, to the container. Similarly, attached to the container adjacent the lower end thereof is a pair of nipples 19 and 21 which may be threaded to receive conduits 22 and 23 in order that liquid may be taken from the tank and gas may be supplied thereto respectively.

In operation of the apparatus the liquid level is maintained between the levels indicated by the broken lines 24 and 25, switch apparatus 26 being actuated in response to movements of a diaphragm 27 supported in the container for controlling the supply of liquid to the container. The diaphragm 27 is attached in a liquid-tight fashion such as welding to the lower end of an inverted bulb-like member 28 from the upper central location of which extends a conduit 29 having its upper end spaced slightly above the upper liquid level (broken line 24). Conduit 29 and bulb-like member 28 have a liquid-tight connection between them so that when the level of the liquid drops to any value below the top of the conduit, the member 28 and the conduit 29 remain filled with liquid and thereby exert a constant pressure against the upper side of diaphragm 27. Member 28 and the conduit 29, together with diaphragm 27, are suspended from the cover 14 by means of a bracket member 31 attached to the cover by any suitable means, such for example as by screws. The lower end of member 28 is spaced upwardly from the bottom of the tank 10 so that liquid inside of the tank may contact the underside of the diaphragm.

Centrally of diaphragm 27 there is an internally threaded boss 32 threaded into which there is a rod 33, the rod extending upwardly through conduit 29 for transmitting movements of diaphragm 27 to the switch mechanism 26 through apparatus subsequently to be described. The upper end of conduit 29 extends above the upper liquid level 24.

The diaphragm 27 is a relatively thin member made of a metal having desirable properties of flexibility and resilience as well as having the property of flexing a large number of times without failure, the latter property being enhanced by the provision of a number of convolutions in the diaphragm.

The upper end of rod 33 extends above the upper liquid level and is attached by a pair of nuts to a transversely extending yoke member 34 which in turn is attached to the lower end of a rod 35, also by means of a pair of nuts, the upper end of rod 35 being threaded into a collar 36. As shown, the rods 33 and 34 are laterally displaced from each other while they extend in the same general direction. The rod 35 extends through an opening in cover 14 and to seal this opening a bellows 37 is sealed to collar 36 and to a flange nut 38 which is threaded into the opening as shown, and has an opening therethrough for the rod 35. The bellows 37 is very flexible so as not to substantially resist canting movements of rod 35 effected by diaphragm movements in response to changes in liquid level. Furthermore, the bellows is capable of withstanding relatively high pressure since the area inside of the bellows will be subjected to the pressure of any gas existing in the volume above the upper liquid level. Attached to the collar 36 is a switch actuating member 39 provided at one end with an adjusting screw 40, the position of which may be determined by a jam nut, the end of screw 40 being placed so as to actuate the contacts of switch 26. Adjacent the other end of actuating member 39 there is a pair of pins 41 (only one of which is illustrated), one being on each side of the member 38 so as to form a guide for the tilting movements thereof.

Arranged over bellows 37 is an inverted cup-like member 42 provided with a slit in each side to receive the actuating member 38 and to provide for its movements. The cup 42 is attached to cover 14 by means of screws 43, and centrally in its top there is a collar 44 through which a screw 45 passes to engage the center of collar 36, a jam nut 46 being provided in order that the position of screw 45 may be fixed in position. The end of screw 45 and the socket receiving it in collar 36 fit smoothly so that the collar may pivot about the end of the screw.

When the apparatus is in operation, the height of the liquid may vary between levels indicated by broken lines 24 and 25 and since gas entering the container through conduit 23 will bubble up through the liquid in the container, there will be an atmosphere of gas above the surface of the liquid, which gas will exert a pressure on the inside of the bellows 37. However, the adjusting screw 45 is so positioned that it will contact the collar 36 when the bellows is in its free expanded length when no gas pressure exists in the container and there is no liquid therein including the conduit 29 and bulb 28. In this instance, the diaphragm 27 is in its equilibrium position. Moreover, the yoke 34 is placed horizontally by the attaching nuts when no liquid or gas is in the container so that the diaphragm and bellows assume their natural positions. Consequently, when there is gas in the container, the pressure thereof against the inside of bellows 37 will tend to hold collar 36 against screw 45, but due thereto no upward movement of collar 36 occurs and no upward force is exerted on diaphrigm 27.

Liquid, for example water, is supplied to the tank through a conduit 47 by means of a pump 48, a check valve 49 being provided to prevent rearward flow of liquid as well as of gas. For this purpose the check valve 49 is one capable of holding gas at relatively high pressure. The inner end of conduit 17 may be bent angularly as shown whereby a portion thereof overlaps the upper edge of conduit 29. Consequently, whenever liquid flows into the tank a certain amount thereof flows into conduit 29 and keeps members 28 and 29 filled with liquid. The overlap of conduits 17 and 29 preferably is small so that the liquid flowing into conduit 29 may be in the form of a spray and thus will not exert any substantial force on rod 33. Interference with switch operation is thus prevented. The pump 48 is adapted to be driven by means of an electric motor 51 which is supplied with power from a source S through the following circuit: From S through conductor 52 to motor 51; from source S through conductor 53 through contacts 54 and 55 (shown dotted) of the switch mechanism 26 and through conductor 56 to the motor 51. With the apparatus as described, whenever the liquid level is at that indicated by the broken line 24, the contacts 54 and 55 will be open. Consequently, the supply circuit to motor 51 is open and there is no flow of liquid. Whenever the liquid level drops to that indicated by the broken line 25, contacts 54 and 55 will be closed thereby supplying power to motor 51 which will actuate the pump 48 to supply liquid to the container until its level reaches that of the broken line 24. The mixture of liquid and entrapped gas may be removed as desired through the conduit 22.

Since there are both liquid and gas present in the container 10 at all times, it is clear that the pressure on the underside of diaphragm 27 is equal to the pressure exerted by the height of the liquid in the container plus the pressure exerted by the gas on top of the liquid. Similarly, the pressure on the upper surface of diaphragm 27 is that of the height of liquid in conduit 29 plus the pressure of the gas above the surface of the liquid, the height of the liquid in conduit 29 being substantially constant at all times and equal to the height of the conduit. Under the conditions of liquid at maximum level, the pressures on the two sides of the diaphragm are not equal but differ by the pressure due to the height of liquid between level 24 and the upper end of conduit 29. This difference is small but is necessary in order that switch operation occurs before the liquid in the tank and conduit become equal in height (because of screw 45, bellows 37 does not exert an upward force on the essentially balanced pressure system). However, when the level of the liquid drops below the level 24, thereby further decreasing the pressure on the underside of diaphragm 27, the pressure on the upper side of the diaphragm remains that determined by the height of the column of liquid within the conduit 29 and the inverted member 28 plus the pressure exerted by the gas on top of the liquid. Accordingly, the pressure of the gas is exerted on both sides of the diaphragm at all times and the liquid pressure exerted against the upper side of the diaphragm remains substantially constant, whereas the liquid pressure on the bottom surface of the diaphragm varies with changing liquid heights in the container.

As the liquid level decreases below that of the broken line 24, the diaphragm flexes downwardly under the continued pressure of the liquid inside of conduit 29. Due to the upward force of bellows 37 arising out of its own resilience and to the gas pressure inside of it, downward movement of collar 36 is resisted and it remains held against screw 45. But downward movement of rod 33 (following diaphragm 27) due to the lateral displacement from rod 35 and the yoke 34 causes rod 35 to cant or pivot clockwise about the end of screw 45 as a center to the position shown dotted in Fig. 2. This in turn causes member 39 to cant or pivot also. As the liquid level reaches that of the broken line 25, the pressure on the underside of the diaphragm is decreased sufficiently to permit the pressure on the upper side of the diaphragm to flex the diaphragm downwardly a proper amount to cant member 39 sufficiently so as to close contacts 54 and 55. Consequently liquid is supplied to the tank. The canting of rod 35 need be only a few degrees to effect operation of switch 26. The volume change in bellows due to this small cant is small, and consequently, does not materially resist canting of rod 35 due to the gas pressure. Likewise the inherent flexibility of the bellows does not materially resist small rod movements. Thus the diaphragm 27 may flex under changing liquid heights without material resistance by the bellows seal while producing an external manifestation of the change through the container wall.

The limits between maximum and minimum liquid levels may be chosen as desired within the limits of diaphragm to flex under pressure differences. As the liquid height increases in the tank toward the broken line 24, pressure on the two sides of the diaphragm approaches equalization thereby permitting the diaphragm to move under its own flexibility toward its initial position. This moves the member 39 and the actuating screw 29 counterclockwise until, when the liquid level reaches its upper level, the member 39 is moved to its initial position and the contacts 54 and 55 spring open under their own resilience, thereby interrupting the circuit to the motor. Consequently the liquid flow stops. The resilience of bellows 37 and the pressure of the gas therein also assist the rod 35 in returning to neutral position.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A liquid level control device comprising a container, liquid communicating means associated with said container, means for holding a column of liquid suspended from said cover, a flexible diaphragm sealed to the other end of said holding means, and actuating means associated with said diaphragm for controlling the supplying of liquid through said communicating means in response to changes in liquid level in said container.

2. A liquid level control device comprising a container including a cover, liquid communicating means associated with said container, means for holding a column of liquid suspended at one end from said cover, a flexible diaphragm sealed to the other end of said holding means, actuating means associated with said diaphragm and extending through said cover, for controlling the supplying of liquid through said communicating means, and flexible sealing means associated with said cover for sealing said actuating means to said cover.

3. A liquid level control device comprising a container including a cover, liquid communicating means associated with said container, means for holding a column of liquid suspended at one end from said container, a flexible diaphragm sealed to the other end of said holding means, actuating means attached to said diaphragm and extending through said cover, bellows means for sealing said actuating means to said cover, and control means operated by said actuating means for controlling the supplying of liquid through said communicating means.

4. Gas and liquid apparatus comprising a container, means for supplying liquid to said container, means for supplying gas to said container, means for removing liquid from said container, a flexible diaphragm supported inside of said container, means for subjecting one side of said diaphragm to a substantially constant liquid pressure and to the pressure of said gas, the other side of said diaphragm being adapted to be exposed to said gas pressure and the pressure of the liquid in said container, and means connected to said one side of said diaphragm for controlling the supply of liquid through said liquid supply means in response to changes in liquid level in said container.

5. Gas and liquid apparatus comprising a container, means for supplying liquid to said container, means for supplying gas to said container, means for removing liquid from said container, means suspended at one end within said container for holding a column of liquid, a flexible diaphragm sealed to the other end of said holding means, and actuating means connected to said diaphragm for controlling said liquid supplying means in response to changes in liquid level in said container.

6. A liquid level control device comprising a container, liquid communicating means associated with said container, a flexible diaphragm supported inside of said container, means for subjecting one side of said diaphragm to a substantial constant liquid pressure, the other side of said diaphragm being adapted to being exposed to the pressure of the liquid in said container, movement transmitting means connected to said diaphragm, further movement transmitting means extending out of said container, a flexible seal between said further transmitting means and said container, means resisting outward movement of said further movement transmitting means, a connector between said movement transmitting means and said further movement transmitting means, said movement transmitting means and said further movement transmitting means being displaced from each other whereby movements of said diaphragm produce canting of said further movement transmitting means, and an operating member movable by the canting of said further movement transmitting means for controlling the supply of liquid through said liquid communicating means.

7. A liquid level control device comprising a container, liquid communicating means associated with said container, means for holding a column of liquid within said container, said holding means including a flexible diaphragm sealed to the lower end thereof, actuating means attached to said diaphragm and extending outwardly of said container, bellows means for sealing said actuating means to said container, and control means operated by said actuating means for controlling the supply of liquid through said communicating means.

8. A liquid level control device comprising a container, liquid communicating means associated with said container, means for holding a column of liquid within said container, said holding means including a flexible diaphragm sealed to the lower end thereof, actuating means associated with said diaphragm and extending through said container for controlling the supply of liquid through said communicating means, and flexible sealing means associated with said container for sealing said actuating means to said container.

9. A liquid level control device comprising a container, liquid communicating means associated with said container, a flexible diaphragm supported inside of said container, means for subjecting one side of said diaphragm to a substantially constant liquid pressure, the other side of said diaphragm being adapted to be exposed to the pressure of the liquid in said container, movement transmitting means connected to said diaphragm, further movement transmitting means extending generally parallel to said movement transmitting means and extending out of said container, a bellows seal between said further transmitting means and said container, means resisting outward movement of said further movement transmitting means, a connector between said movement transmitting means and said further movement transmitting means, said movement transmitting means and said further movement transmitting means being latterly displaced from each other whereby movement of said diaphragm produces canting of said further movement transmitting means, and an operating member movable by the canting of said further movement transmitting means for controlling the supply of liquid through said liquid communicating means.

10. A liquid level control device comprising a container, liquid communicating means associated with said container, a flexible diaphragm supported inside of said container, means for subjecting one side of said container to a substantially constant liquid pressure, the other side of said diaphragm being adapted to be exposed to the pressure of the liquid in said container, movement transmitting means connected to said diaphragm, further movement transmitting means extending generally parallel to said movement transmitting means and extending out of said container, a bellows seal between the said further movement transmitting means and said container, means for permitting pivoting of said further movement transmitting means adjacent its attachment to said seal and for preventing movement of said further movement transmitting means out of said container, a connector between said movement transmitting means and said further movement transmitting means, said movement transmitting means and said further movement transmitting means being laterally displaced from each other, whereby movement of said diaphragm produces pivoting of said further movement transmitting means and means movable by the pivoting of said further movement transmitting means for controlling the supply of liquid through said liquid communicating means.

CHARLES H. FLUBACKER.

REFERENCES CITED

The following references are of record in the file of this patent:

UNITED STATES PATENTS

| Number | Name | Date |
|---|---|---|
| 1,511,498 | Boppre | Oct. 14, 1924 |
| 1,538,204 | Mueller | May 19, 1925 |
| 1,806,968 | Fahrney | May 26, 1931 |
| 1,838,443 | Persons | Dec. 29, 1931 |
| 2,199,677 | Sandberg | May 7, 1940 |
| 2,226,325 | Sandford | Dec. 24, 1940 |
| 2,239,481 | Christensen | Apr. 22, 1941 |
| 2,269,383 | Schultz | Jan. 6, 1942 |